(12) United States Patent
Anderberg et al.

(10) Patent No.: US 10,346,998 B1
(45) Date of Patent: Jul. 9, 2019

(54) METHOD OF MERGING POINT CLOUDS THAT IDENTIFIES AND RETAINS PREFERRED POINTS

(71) Applicant: Nurulize, Inc., Los Angeles, CA (US)

(72) Inventors: Tobias Anderberg, Los Angeles, CA (US); Malik Williams, Los Angeles, CA (US)

(73) Assignee: Nurulize, Inc., Los Angeles, CA (US)

( * ) Notice: Subject to any disclaimer, the term of this patent is extended or adjusted under 35 U.S.C. 154(b) by 0 days.

(21) Appl. No.: 16/284,572

(22) Filed: Feb. 25, 2019

(51) Int. Cl.
  *G06K 9/00* (2006.01)
  *G06T 7/593* (2017.01)
  *G06T 7/00* (2017.01)
  *G06T 7/11* (2017.01)

(52) U.S. Cl.
  CPC .......... *G06T 7/593* (2017.01); *G06T 7/0002* (2013.01); *G06T 7/11* (2017.01); *G06T 2207/10028* (2013.01); *G06T 2207/20021* (2013.01); *G06T 2207/20221* (2013.01)

(58) Field of Classification Search
  CPC ......... G06T 7/593; G06T 7/11; G06T 7/0002; G06T 2207/10028; G06T 2207/20221; G06T 2207/20021
  See application file for complete search history.

(56) References Cited

U.S. PATENT DOCUMENTS

| | | | |
|---|---|---|---|
| 7,995,055 B1 * | 8/2011 | Ma | G06K 9/4604 345/420 |
| 10,018,711 B1 * | 7/2018 | Sebastian | G01S 17/023 |
| 2016/0154999 A1 * | 6/2016 | Fan | G06K 9/00201 382/103 |
| 2018/0313956 A1 * | 11/2018 | Rzeszutek | G01S 17/89 |
| 2018/0336724 A1 * | 11/2018 | Spring | G06T 19/00 |
| 2019/0087978 A1 * | 3/2019 | Tourapis | G06T 9/00 |

* cited by examiner

*Primary Examiner* — Tom Y Lu
(74) *Attorney, Agent, or Firm* — Arc IP Law, PC; Joseph J. Mayo

(57) ABSTRACT

Method that merges two or more point clouds captured from a scene, eliminates redundant points, and retains points that best represent the scene. The method may generally include a detection step, which locates points from different clouds that are close and thus potentially redundant, followed by a selection step that identifies preferred points. Clouds may be represented as range images, which may simplify both steps. Closeness testing may be optimized by dividing range images into tiles and testing tile bounding volumes for intersections between clouds. Selection of preferred points may incorporate user input, or it may be fully or partially automated. User selection may be performed using 2D drawing tools on range images to identify images with preferred views of a scene. Automated selection may assign a quality measure to points based for example on the surface resolution of each point cloud scan at overlapping points.

20 Claims, 18 Drawing Sheets

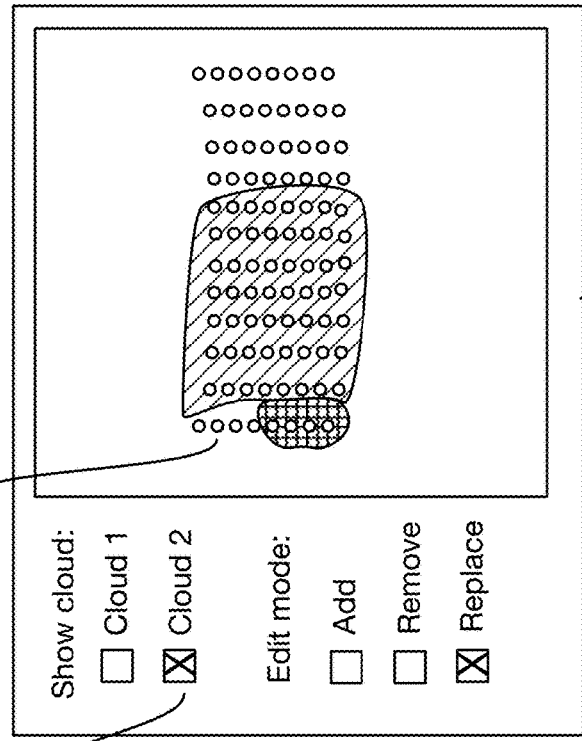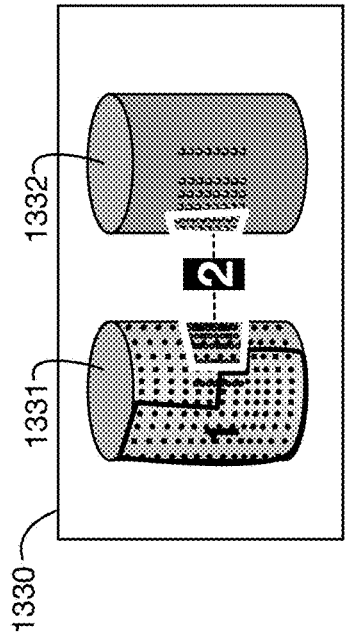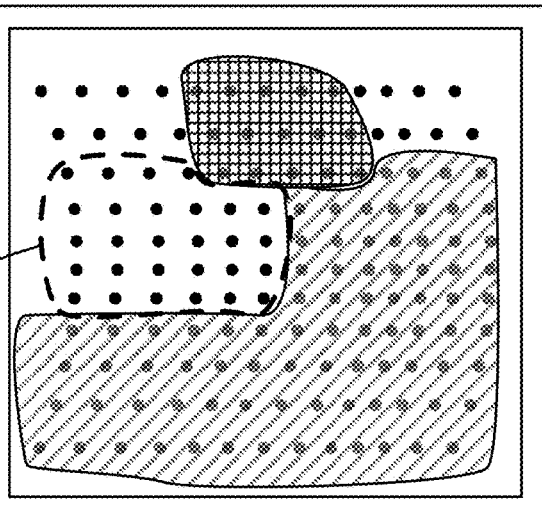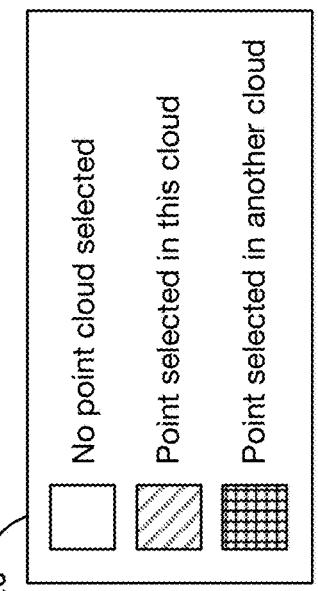
FIG. 15

$$\cos\alpha_1/(d_1\tan\theta_1) > \cos\alpha_2/(d_2\tan\theta_2)$$

METHOD OF MERGING POINT CLOUDS THAT IDENTIFIES AND RETAINS PREFERRED POINTS

BACKGROUND OF THE INVENTION

Field of the Invention

One or more embodiments of the invention are related to the fields of computer graphics and virtual reality. More particularly, but not by way of limitation, one or more embodiments of the invention enable a method of merging point clouds that identifies and retains preferred points.

Description of the Related Art

Capturing 3D data from a scene using scanners such as LIDAR may involve multiple scans, sometimes from different viewpoints. The point clouds resulting from these multiple scans may be combined to form an integrated 3D model of the scene. However, scans may overlap in certain regions of the scene. Retaining all points in the overlapping regions may consume unnecessary storage and processing capacity, and may lead to rendering artifacts or noise when transitioning from one area of the scene to another. It is therefore desirable to eliminate redundant points when merging point clouds.

Traditional methods known in the art of combining point clouds usually use an expensive octree nearest-neighbor search, often with a simple distance threshold to determine which points to remove. This approach may require iterative experimentation to find an appropriate threshold, which may be very slow, particularly for very large point clouds.

Point clouds are often organized as range images. Range image point clouds have perspective properties that may lead to artifacts using the single distance threshold test for redundancy. Range images also support a more efficient and intuitive process for finding redundant points and for selecting an appropriate point from a set of nearby points. There are no known methods for combining point clouds that are optimized for range image formats.

Known methods for removing redundant points also do not typically consider the quality of each point cloud in areas where the clouds overlap. For example, one scan may capture a region of a scene in great detail, while another scan may only peripherally capture that region at much lower resolution. There are no know methods that provide mechanisms to either manually or automatically assess the quality of each point cloud to select preferred points for a merged point cloud.

For at least the limitations described above there is a need for a method of merging point clouds that identifies and retains preferred points.

BRIEF SUMMARY OF THE INVENTION

One or more embodiments described in the specification are related to a method of merging point clouds that identifies and retains preferred points. Embodiments of the invention may for example process two or more point clouds captured from a common 3D scene to remove redundant points in areas of overlap while keeping the best points. Any or all processing steps may be performed using a computer that has or is attached to a memory. Processing steps performed by the computer may include obtaining the point clouds, obtaining or generating a closeness test that determines whether two distinct points are sufficiently close that at most one should be retained, identifying groups of close points that satisfy the closeness test and isolated points that are not close to any other cloud, selecting a preferred point for each group of close points, and generating the merged point cloud by combining the preferred points and the isolated points. In addition to points, point clouds may contain the viewpoint from which they were captured, and the angular resolution at which they were captured.

In one or more embodiments, point clouds may be organized as range images, each with a 2D array of pixels containing a distance to the associated point. Associated with each range image may be a projection from the 3D scene to the 2D pixel array. An illustrative projection that may be used in one or more embodiments is a spherical equirectangular projection.

To find close points, one or more embodiments may use the range image of a base point cloud, and project other point clouds onto this range image. Points projected to a pixel may be close to the base cloud's pixel point if their distance from the base point cloud viewpoint is close to the distance in the range image pixel.

Embodiments may partition the pixels of a range image into tiles, and generate a bounding volume for the points associated with pixels in each tile. Intersection tests between tiles from different point clouds may be used as a preliminary test for point closeness. Tiles whose bounding volumes intersect may be linked to one another, and only points from intersecting tiles may be projected onto the pixels of a base point cloud range image for the closeness test described above.

Selection of preferred points from groups of close points may be performed with user input or fully automatically. In one or more embodiments, a user interface may be presented that allows a user to select a point cloud to display; for example, the range image associated with that point cloud may be displayed. The display of the points may include an indicator that shows whether each point in the displayed cloud is the preferred point for a group of close points it belongs to. This indicator may also show whether the point is a member of a group with a preferred point belonging to a different cloud. The indicator may be for example a color, a shade, or a pattern. The user may be able to provide a selection input to select one or more points, and an action such as add, replace, or remove that modifies the assignment of preferred points. For example, the add action may set the selected points to preferred points, and the remove action may clear the selected points from being preferred points.

One or more embodiments may automatically select preferred points by calculating a quality measure for each point in a group, and choosing the point with the highest quality measure. An illustrative quality measure may be inversely related to the resolution of each point cloud at each point. This resolution may be calculated for example as twice the length of the view vector from the point cloud viewpoint to the point, multiplied by the tangent of one half of the point cloud's angular resolution. In one or more embodiments this resolution may be further divided by the cosine of the angle between the view vector and the normal vector to the surface of the 3D scene at the point.

BRIEF DESCRIPTION OF THE DRAWINGS

The above and other aspects, features and advantages of the invention will be more apparent from the following more particular description thereof, presented in conjunction with the following drawings wherein:

FIG. 15 continues the example of FIG. 14 to show the user deleting some selected points, and viewing the effect of this deletion from the perspective of another cloud.

FIG. 18A is a perspective view and FIG. 18B is a top view.

DETAILED DESCRIPTION OF THE INVENTION

A method of merging point clouds that identifies and retains preferred points will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
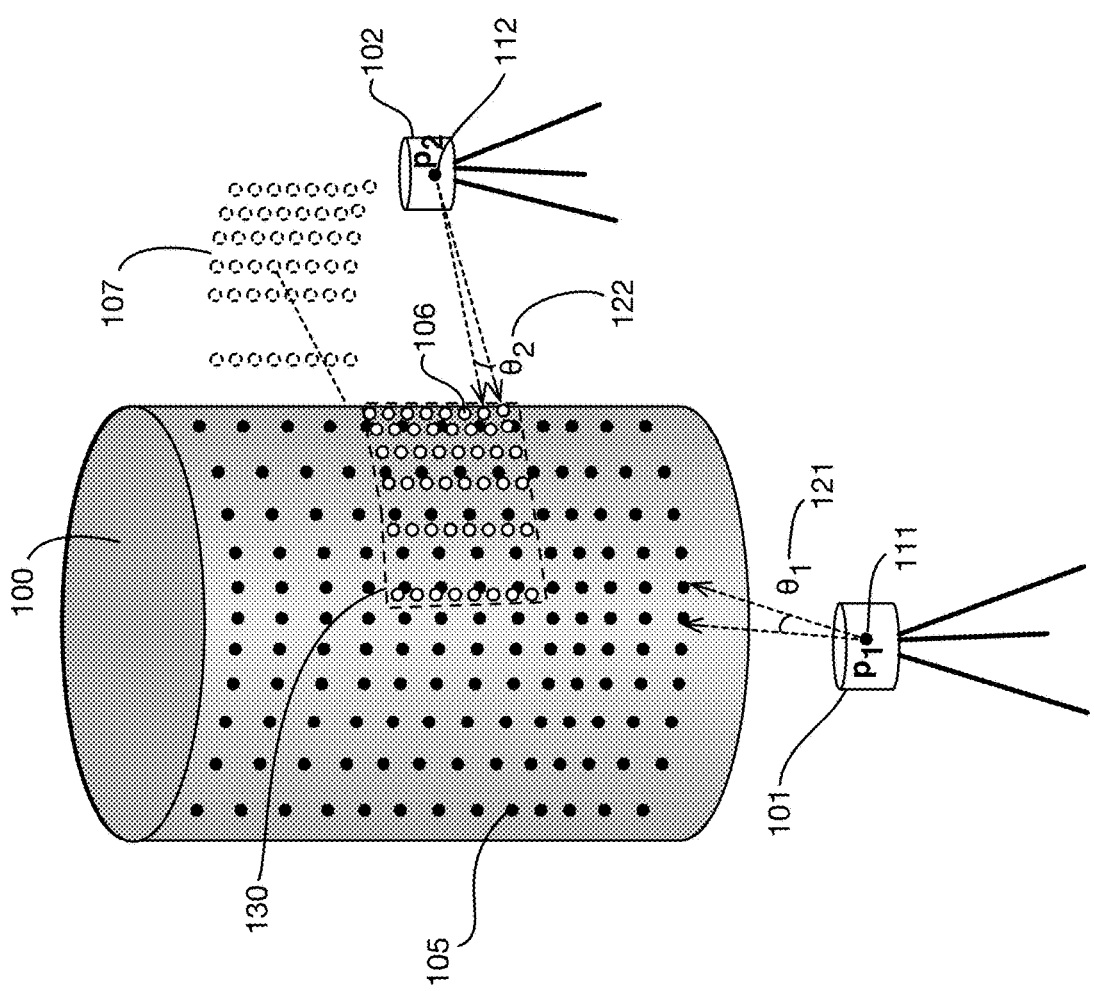
FIG. 1 shows an example of a scenario addressed by one or more embodiments of the invention, where two point clouds are captured from a scene and the point clouds overlap in a portion of the scene.

FIG. 1 illustrates a scenario that may be addressed by one or more embodiments of the invention: Multiple point clouds may be captured from a common 3D scene, and it may be desirable to merge these point clouds into a single combined cloud. However, including all points of all of the clouds in the combined cloud may be undesirable because there may be redundancy in areas of the 3D scene that are included in multiple clouds. In addition to consuming unnecessary storage and processing resources, redundant points may lead to artifacts in transitions between clouds.

Figure 2:
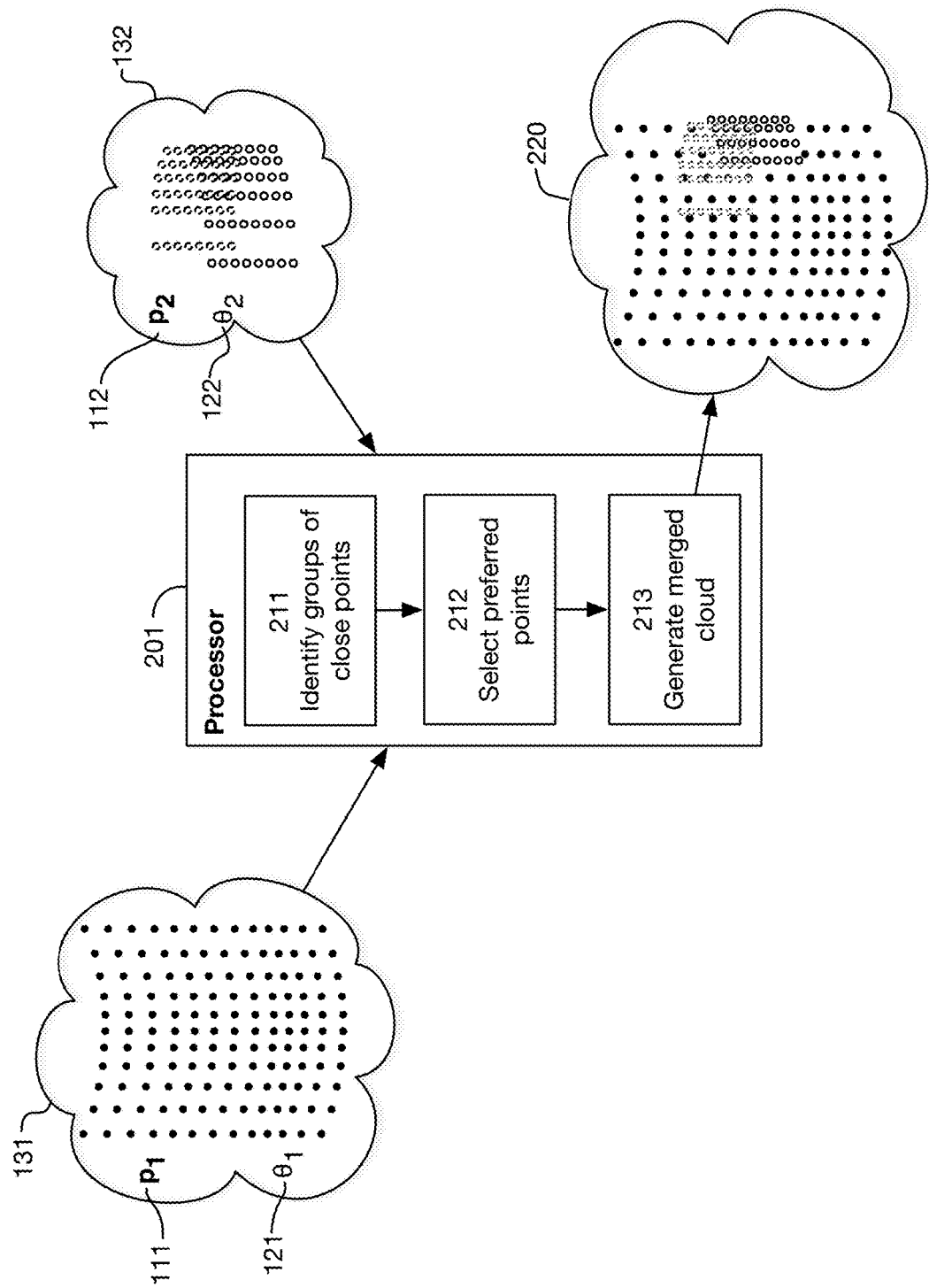
FIG. 2 shows a high-level flowchart of illustrative inputs, outputs, and processing steps of one or more embodiments of the invention.

In the illustrative example shown in FIG. 1, the 3D scene is a simple cylinder 100. This shape is shown for ease of exposition; in applications, any number of point clouds may be captured from any 3D scene or scenes of any size and complexity. The point clouds merged by one or more embodiments of the invention may be captured from a real environment, from a computer-generated environment, or from any combinations thereof. In FIG. 2, two point clouds are captured from the scene 100; a first point cloud (shown with black dots) is captured by a scanner 101, and a second point cloud (shown with white dots) is captured by a scanner 102. Illustrative points of the point clouds are point 105 captured by scanner 101 and point 106 captured by scanner 102. (In one or more embodiments, scanners 101 and 102 may be physically identical, but may be repositioned or reactivated for different scans at different times.) One or more embodiments may process and merge any number of point clouds, including but not limited to two point clouds.

Scanners 101 and 102 may be any type or types of 3D scanners or 2D sensors combined to form 3D data from the scene, including for example, without limitation, LIDAR, structured light, and stereo vision. Associated with each scanner may be certain parameters, such as for example a viewpoint from which the scan was taken, and one or more angular resolutions for the scan points. For example, scanner 101 captures the first point cloud from viewpoint 111, with angular resolution 121, and scanner 102 captures the second point cloud from viewpoint 112, with angular resolution 122. Angular resolution may not be constant across the scan, and it there may be a different horizontal and vertical angular resolution. The term angular resolution in this specification refers to any or all of the possible angular resolutions with which a point cloud is captured. For ease of illustration, the examples show only a single angular resolution that may for example be constant across the scan and across axes.

Because point clouds may be captured from different viewpoints, they may capture different features of a 3D scene. For example, in FIG. 1 scanner 102 captures points 107 that are on the back side of cylinder 100, as well as points such as point 106 on the front side (which is visible in FIG. 1); scanner 101 captures only points on the front side of the cylinder. However, point clouds may overlap in one or more regions, such as region 130. To generate a complete "gestalt" point cloud that represents the entire scene, one or more embodiments may select certain preferred points from the point clouds in the region or regions of overlap. Illustrative processes for selecting these preferred points are described below.

For ease of illustration, the point clouds shown in FIG. 1 contain a small number of points each. In practice, point clouds may contain millions or billions of points each; hence processing and storage efficiency for merging of point clouds is a significant concern. The processes described below may address these issues by organizing data for efficient access and by optimizing point comparisons to avoid unnecessary processing.

FIG. 2 shows a high-level flowchart of inputs, outputs, and processing steps that may be used in one or more embodiments of the invention to merge two or more point clouds, using the data from FIG. 1 as an example. Point clouds 131 and 132 captured from a 3D scene are obtained, for example directly from scanners or from memory. In addition to the three-dimensional points themselves in point clouds 131 and 132, capture attributes such as viewpoints 111 and 112, and angular resolutions 121 and 122, respectively, may be part of the point clouds or linked to the point clouds. One or more embodiments may access other attributes such as for example the vertical and horizontal extents of the captures. The point clouds 131 and 132 must be registered or registerable to a common coordinate system for the 3D scene. Point cloud data 131 and 132 is input to a processor 201 that processes the data, resulting in an output of a merged point cloud 220. The merged point cloud 220 may for example have reduced redundancy in regions of the scene where the point clouds 131 and 132 overlap.

At a high level, processor 201 may perform three steps to transform the individual point clouds 131 and 132 into merged point cloud 220. Step 211 may identify one or more groups of close points, where the criterion for closeness depends on the source point clouds or on the application. These groups represent possible redundancies. Step 212 may select a preferred point from one or more of these groups. In step 213, the preferred points may be combined with other points from the source point clouds to form the final merged point cloud 220.

Figure 3:
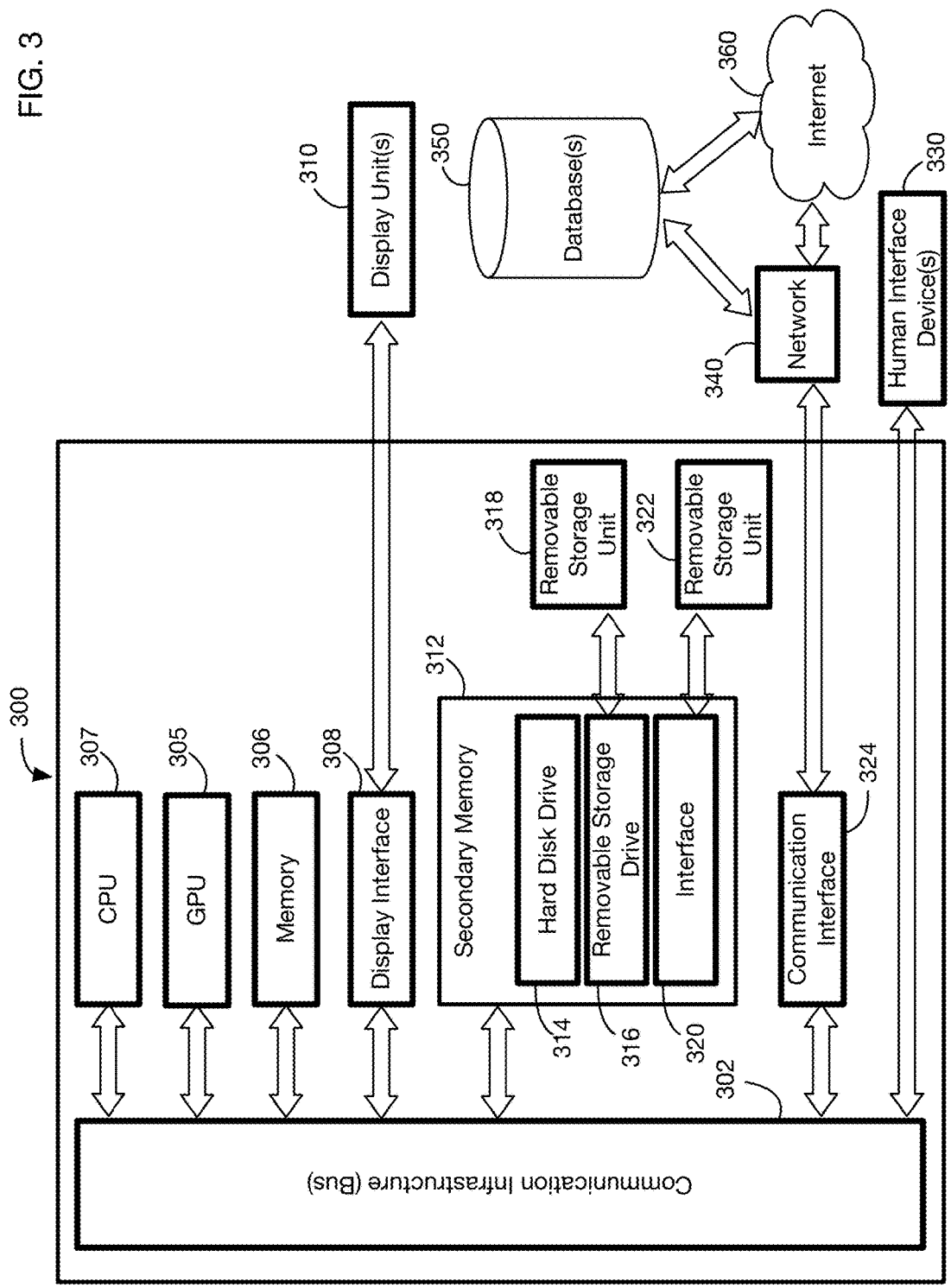
FIG. 3 shows an illustrative computer architecture that may be used in one or more embodiments of the invention to perform processing steps.

FIG. 3 shows illustrative hardware that may be used in one or more embodiments of the invention to execute the steps of FIG. 2 or any other steps described in this specification. This embodiment of exemplary computer 300 that may be utilized in, by, or as any component in the system. In one or more embodiments, computer 300 may be a network of computers, each of which may have any or all of the components shown in FIG. 3. In one or more embodiments, computer or computers 300 may also be utilized to implement any function in the system, i.e., any step or act or function that executes in any computer or server or engine in the system. Computer 300 may include processor CPU 307 that executes software instructions specifically tailored to the respective functions of embodiments of the invention. The software instructions, otherwise known as computer program instructions, may reside within memory 306. Computer 300 may include processor GPU 305, which may execute graphics instructions or other instructions for highly parallel operations, for example. GPU program instructions may also reside within memory 306. Computer 300 may include display interface 308, which may drive display unit or units 310 of any computer in the system as desired. Some computers 300 may or may not utilize a display. Computer 300 may include communication interface 324, which may include wireless or wired communications hardware protocol chips. In one or more embodiments of the invention communication interface 324 may include telephonic and/or data communications hardware. In one or more embodiments communications communication interface 324 may include a Wi-Fi™ and/or BLUETOOTH™ wireless communications interface. Any wireless network protocol or type may be utilized in embodiments of the invention. CPU 307, GPU 305, memory 306, display interface 308, communication interface 324, human interface devices 330, secondary memory 312, such as hard disk 314, removable storage 316, secondary memory interface 320 and removable storage units 318 and 322 may communicate with one another over communication infrastructure 302, which is commonly known as a "bus". Communications interface 324 may communicate over any wired or wireless medium that allows for communication with other wired or wireless devices over network 340. Network 340 may communicate with Internet 360 and/or database or databases 350. Database 350 may be utilized to implement any database described herein.

Figure 4:
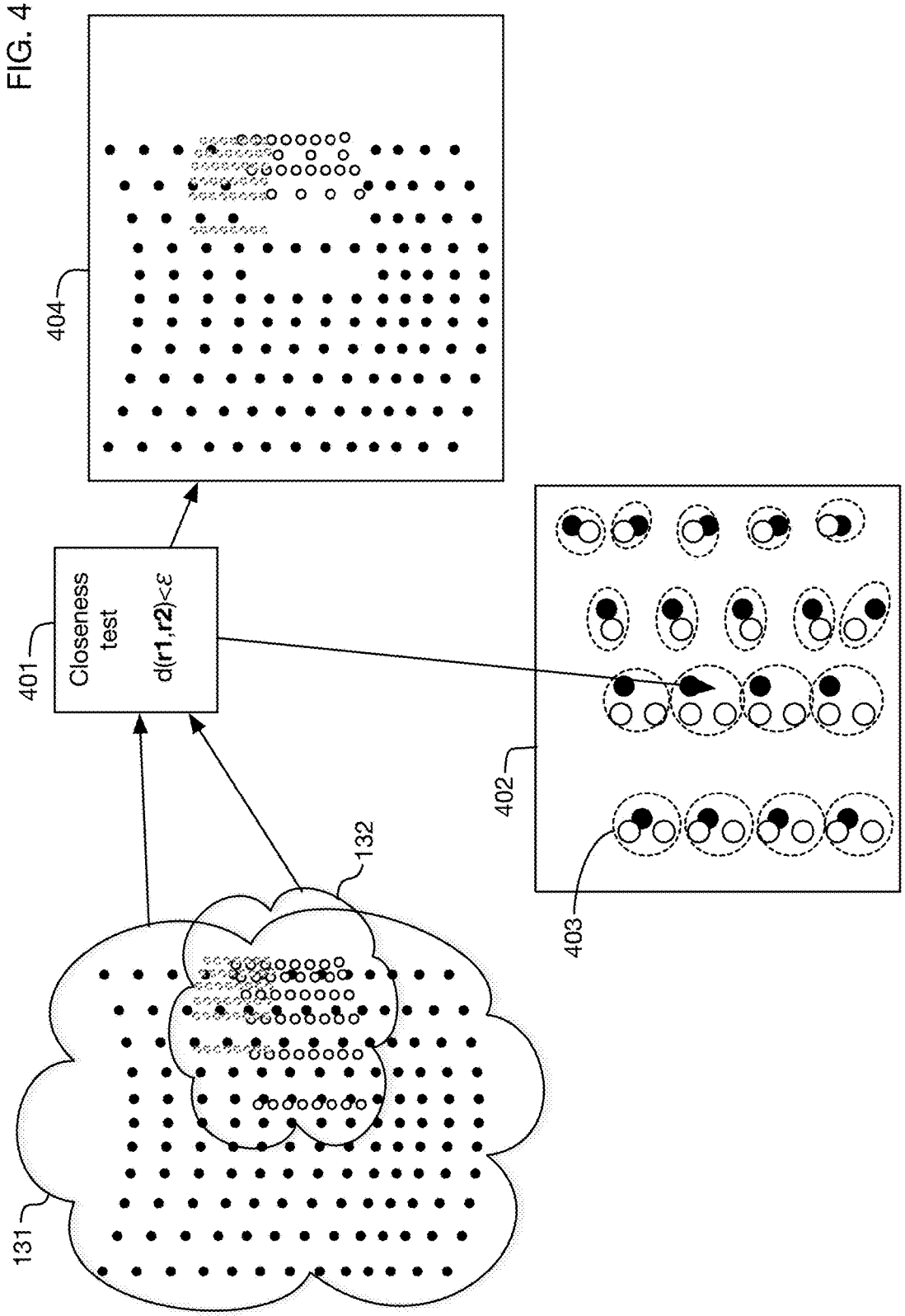
FIG. 4 shows an illustrative step of identifying close points in overlapping sections of point clouds.
Figure 5:
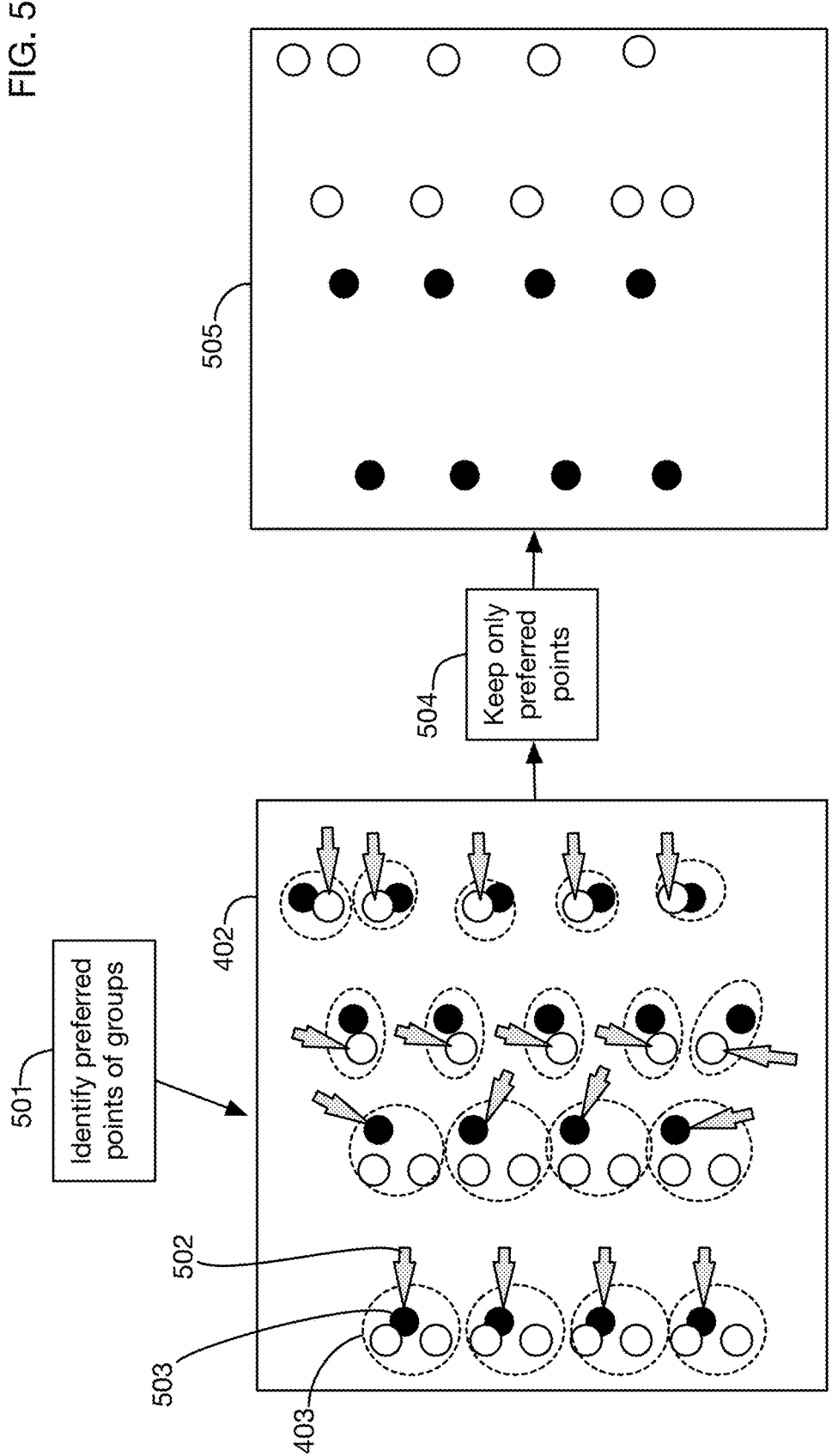
FIG. 5 shows an illustrative step of identifying preferred points in groups of close points.
Figure 6:
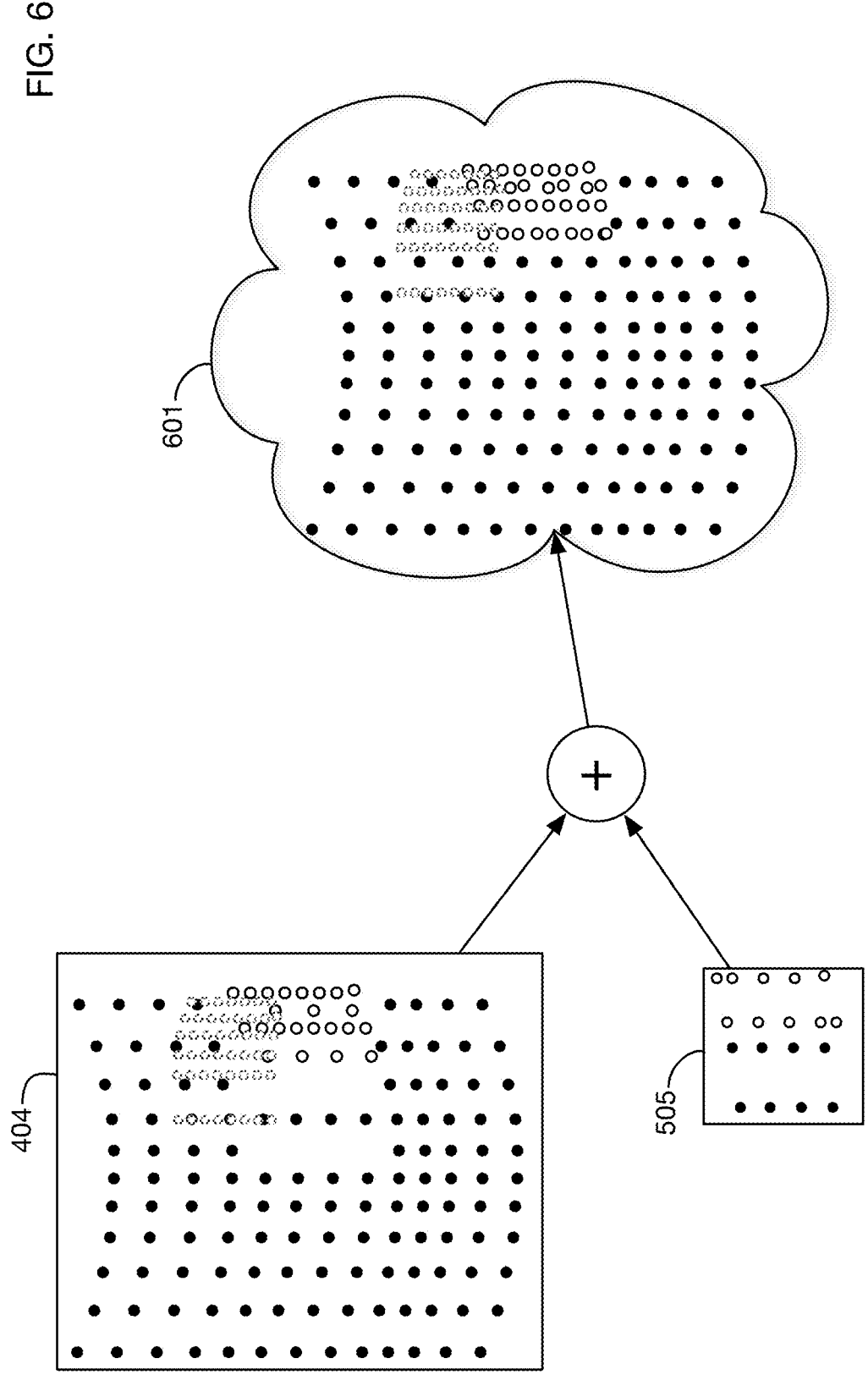
FIG. 6 shows an illustrative step of combining isolated points and preferred points to form a merged point cloud.

FIGS. 4, 5 and 6 illustrate embodiments of the steps 211, 212, and 213, respectively, of FIG. 2. As shown in FIG. 4, one or more embodiments of the invention may define or may obtain a closeness test 401 that determines whether two points are sufficiently close that it may be desirable to remove one (or both) of them from the merged point cloud. One or more embodiments may use any type of closeness test or tests to determine whether points are close together. In the illustrative test 401, a simple distance threshold is used to test whether points are sufficiently close together. Any distance function or functions may be used for this threshold test. Two or more points that are close according to closeness test 401 may be placed into a group, which may be processed as described below to determine a preferred point of the group. In the illustrative example shown in FIG. 4, point clouds 131 and 132 are processed with closeness test 401, resulting in groups 402 of close points. For example, group 403 contains one point of cloud 131 and two points of cloud 132. In general, a group of close points may contain any number of points from any number of point clouds. All points that are not close to any other points in other point clouds may be classified as isolated points 404.

FIG. 5 continues the example of FIG. 4. A process 501 is performed to identify a preferred point of each group in the groups 402 of close points. Preferred points are indicated with an arrow, such as identification 502 to select point 503 as the preferred point of group 403. In this example, a preferred point is identified for each of the groups of close points 402. In one or more embodiments a preferred point may be identified for only a subset of these groups, and all points may be retained for example from groups without a designated preferred point. Any desired method may be used to identify a preferred point, including manual or automated methods described below. After identification 501 of preferred points, step 504 removes non-preferred points and retains only preferred points, resulting in points 505. As illustrated in FIG. 6, these preferred points 505 may then be combined with isolated points 404 to yield a merged point cloud 601.

Figure 7:
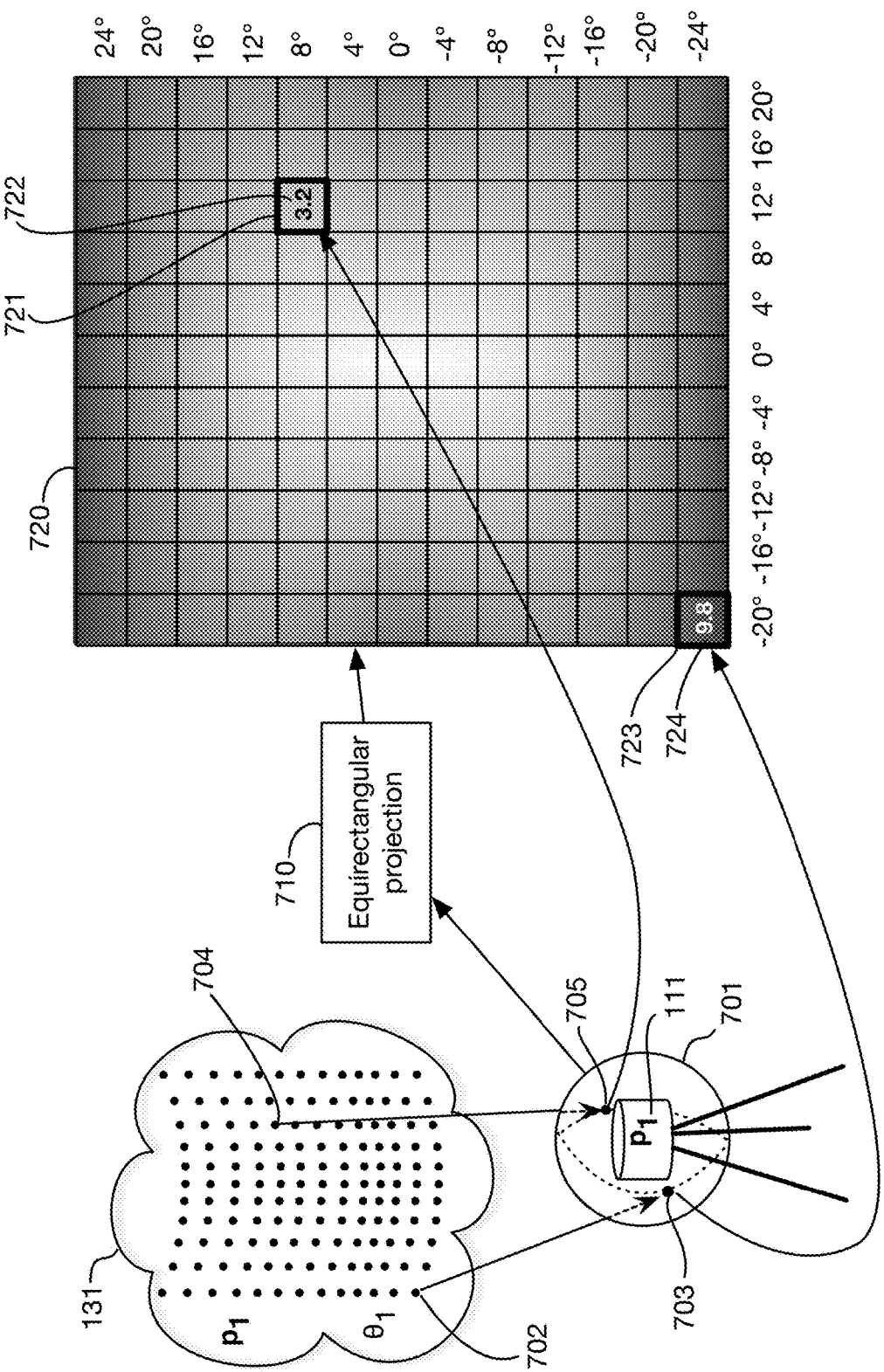
FIG. 7 illustrates a range image format for point cloud data that may be used in one or more embodiments of the invention.

FIGS. 7 through 17 elaborate on the general steps described above, and illustrate specific methods and optimizations that may be used in one or more embodiments to perform these steps. Some of these methods and optimizations may use an organization of point cloud data into a range image. A range image may for example have a 2D array of pixels representing individual samples of the point cloud, where each pixel contains a distance value to the point in the scene captured by the corresponding sample. A range image may support more efficient processing of point cloud data than an unstructured set of three-dimensional points. FIG. 7 shows an illustrative range image representation 720 for point cloud 131. The two-dimensional pixel array 720 represents a projection of the three-dimensional scene onto the pixel coordinates. For illustration, the brightness of each pixel is related to the distance value in each pixel, with brighter pixels corresponding to a smaller distance.

One or more embodiments may use any type or types of projections for range images. The projection illustrated in FIG. 7 is an equirectangular projection 710: points from the three-dimensional scene are projected onto a sphere 701 centered at the viewpoint 111 of the scanner, and then the sphere is mapped with projection 710 to a two-dimensional array. An equirectangular projection may be a natural projection for some point clouds that are captured by incrementing azimuth and elevation angle to scan a scene, since these angles may be mapped to a latitude-longitude of an equirectangular projection. An equirectangular projection also supports representation of full 360-degree horizontal and 180-degree vertical scans (or any subranges thereof) in a 2D pixel array.

Projections are shown for illustrative points 702 and 704 of point cloud 131. Point 702 is projected onto point 703 on sphere 701, which is then mapped to pixel 723 of range image 720. Associated with pixel 723 is a distance 724 between viewpoint 111 and point 702 in the 3D scene. Similarly point 704 is projected onto point 705 on sphere 701, and then to pixel 721 in range image 720, with distance 722 between point 704 and viewpoint 111. Distance values are indicated for pixels 721 and 723; distance values are not shown for other pixels, but are present in the range image for each pixel.

Range image representations of point clouds may facilitate detection of close points. With unstructured point clouds (represented as an unordered set of 3D points, for example), finding points close to a given point may require extensive processing. One approach is to find the distance between all pairs of points; this becomes impractical for large point clouds because of the quadratic growth in the number of calculations as a function of cloud size. Another alternative is to preprocess point clouds into an octree or similar data structure; this approach reduces the number of comparisons but requires an expensive preprocessing step. Use of range image representations may avoids these complications and provide for efficient detection of close points.

Figure 8:
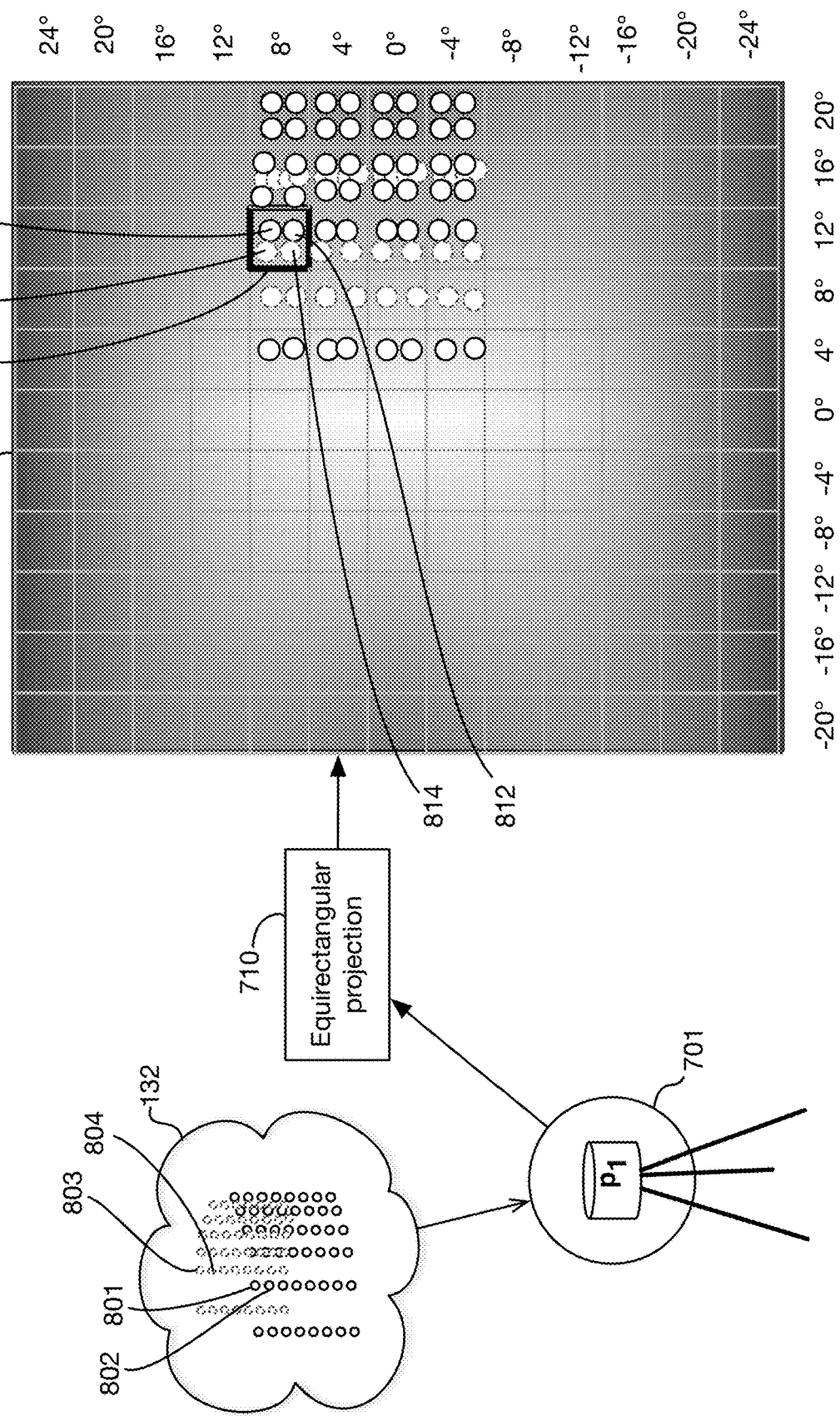
FIG. 8 illustrates projecting points from one cloud onto a range image of another point cloud in order to locate close points.
Figure 9:
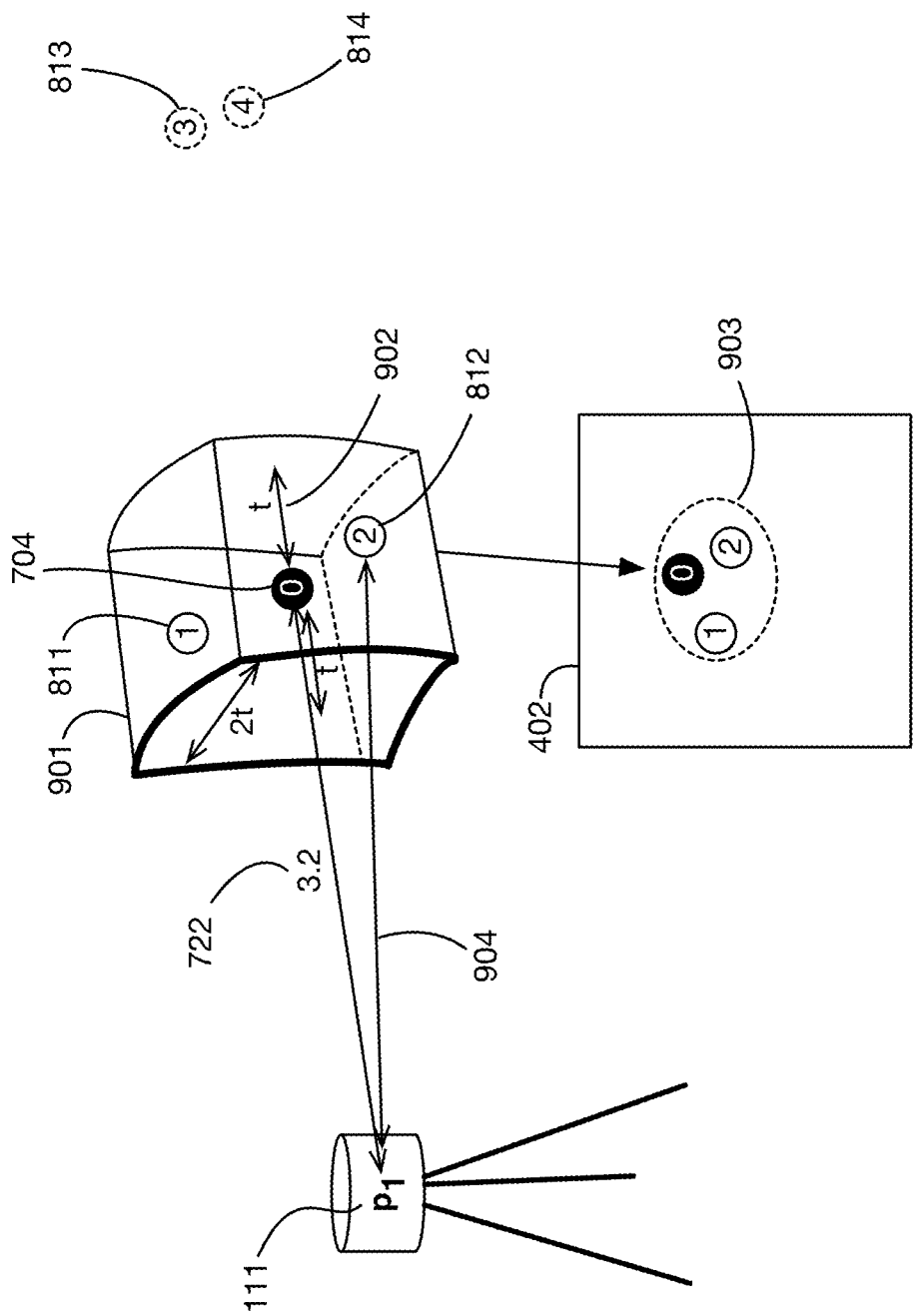
FIG. 9 continues the example of FIG. 8 to show formation of a frustum from a pixel in a range image to determine whether projected points from another cloud are close to the point in the range image cloud.

FIGS. 8 and 9 illustrate a technique for detection of close points using range images that may be use in one or more embodiments. This technique performs a closeness test in two steps: first, it tests whether points project to the same pixel in a range image, and second it tests whether the projected distances associated with the points in the same pixel are within a threshold. FIG. 8 shows projection of the points of point cloud 132 onto the range image 720 associated with the point cloud 131. Points from cloud 132 may be projected onto range image pixels 720 using the projection 710 associated with range image 720, as described with respect to FIG. 7. When projecting one point cloud onto a range image associated with another point cloud, multiple points may be projected to the same pixel. For example, in FIG. 8, points 801, 802, 803 and 804 are all projected onto pixel 810 of range image 720, as projected points 811, 812, 813, and 814, respectively. These points therefore may be candidates for close points to the point 704 of point cloud 131, which is also projected to pixel 810, as shown in FIG. 7. Other points of point cloud 132 are not candidates, because they do not have the same projected pixel.

FIG. 9 continues the example of FIG. 8 to show how a closeness test may be defined for candidate close points in one or more embodiments. This procedure is illustrated for the point 704 of point cloud 131 and the candidate points 811, 812, 813, and 814 of point cloud 132 that are projected onto the same pixel as point 704. Associated with each of these points is a distance between the viewpoint 111 of point cloud 131 and the respective point. For example, point 704 is at distance 722 to viewpoint 111, and point 812 is at distance 904 to viewpoint 111. In one or more embodiments, a threshold distance 902 may be defined, and a point may be considered close to point 704 if the absolute value of the difference between distance 722 and the distance from viewpoint 111 to the point is less than this threshold. The distance threshold may depend on the distance to the point 704.

In one or more embodiments, a closeness test may be defined by considering the projected size of the pixel containing point 704 at the distance 722 from viewpoint 111. In particular, the system may generate a frustum 901 around point 704, and the dimensions of this frustum may depend on the distance to the point 704 and on the angular resolution of the point cloud at that point. Effectively the pixel associated with the point may be projected out from the range image to the point in the point cloud, and a frustum may be generated around the pixel. In one or more embodiments the frustum may have an approximately cubical shape; hence the width may be approximately twice the threshold distance 902. Points from another point cloud that are within this frustum 901 around point 704 may be considered as close to point 704. Using this criterion, points 811 and 812 may satisfy this closeness test, whereas points 813 and 814 may not because they are "behind" point 704 on the back side of cylinder 100. Hence points 704, 811, and 812 may be added to group 903 of close points in groups 402.

Figure 10:
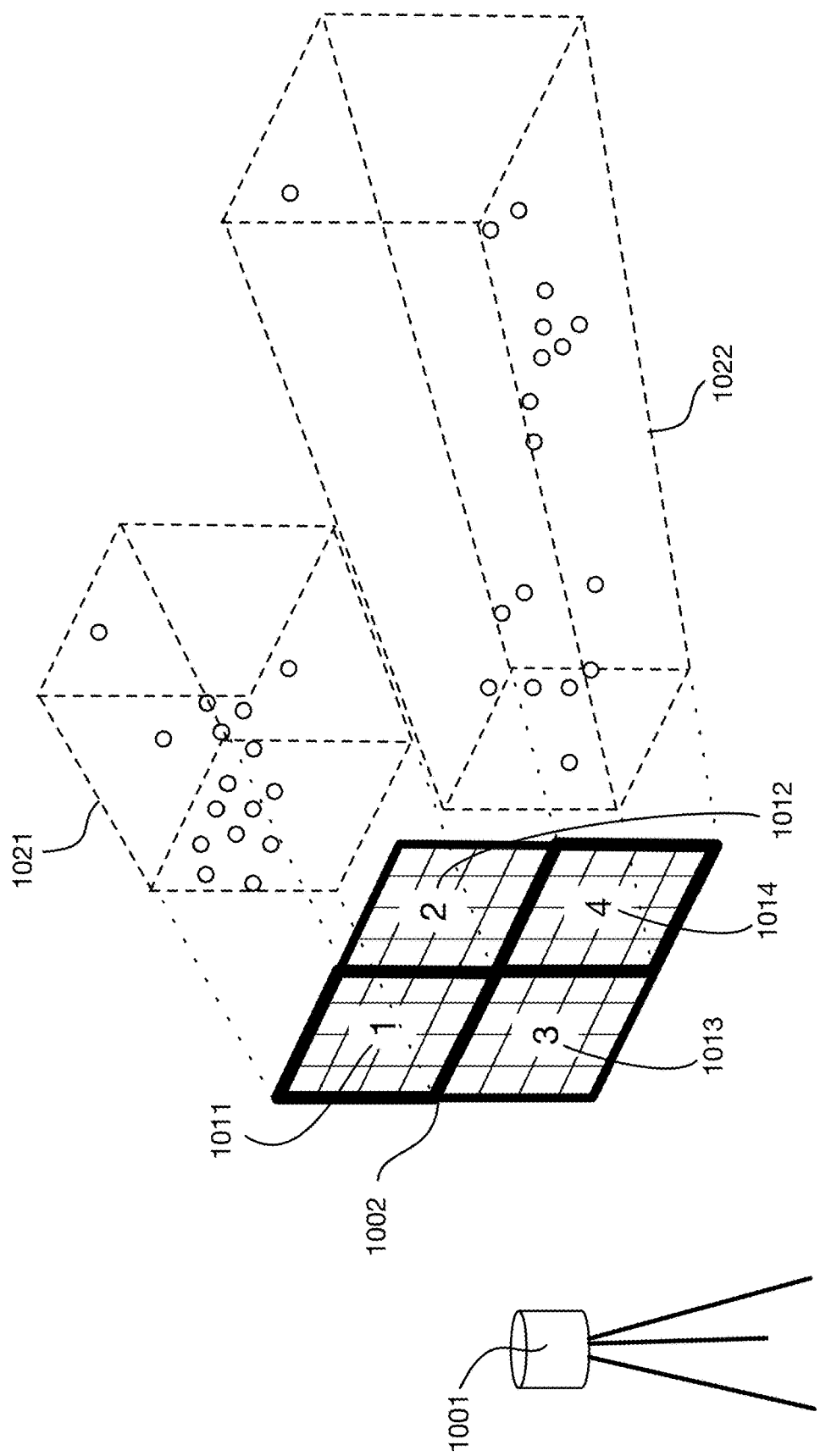
FIG. 10 illustrates dividing a range image into tiles, and generating bounding volumes around points of each tile.
Figure 11:
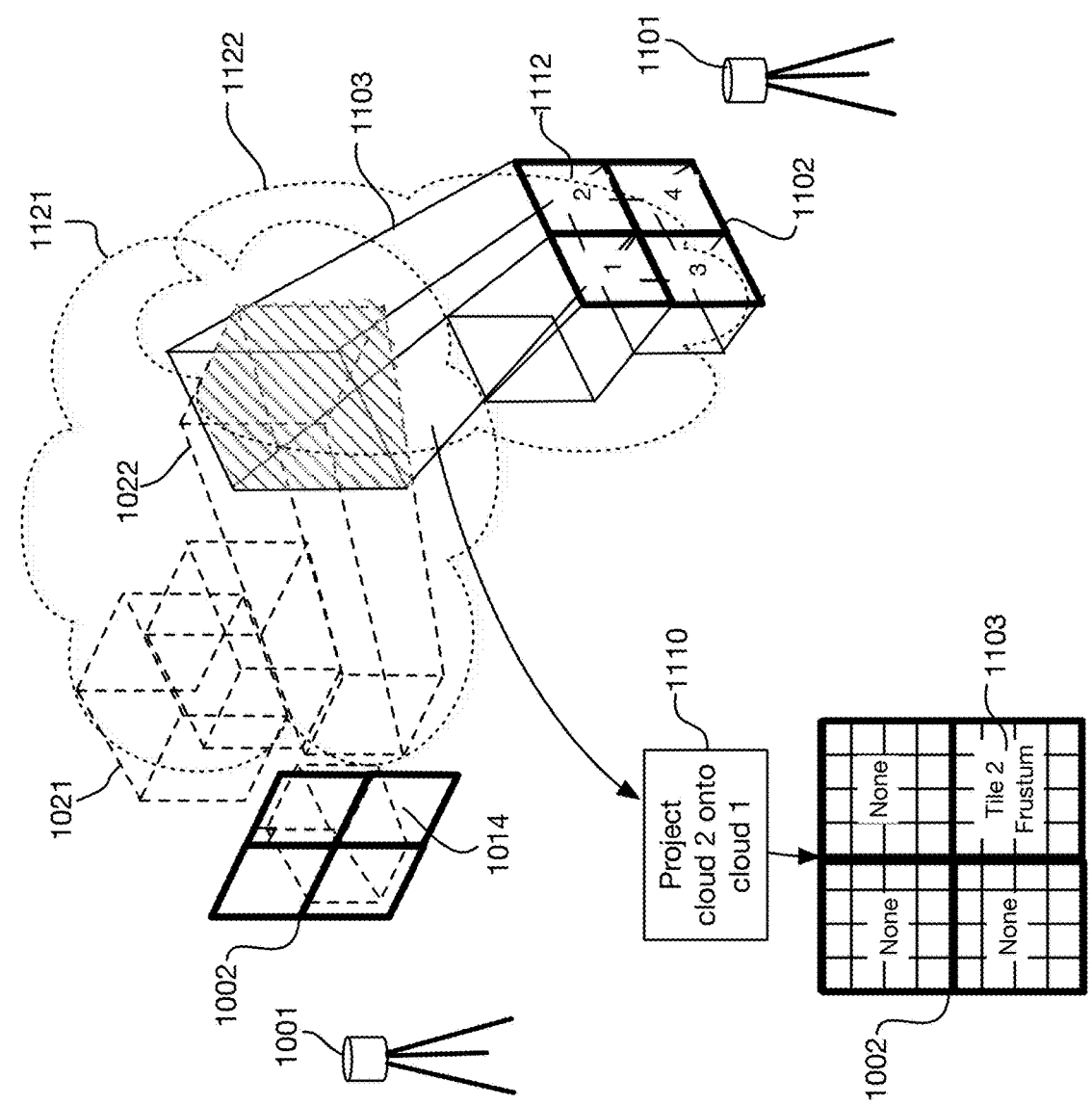
FIG. 11 continues the example of FIG. 10 to show how the bounding volumes associated with tiles may be used to optimize detection of close points.

Additional optimizations to improve efficiency of closeness testing may be performed in one or more embodiments. One such optimization is illustrated in FIGS. 10 and 11. FIG. 10 shows portions of a point cloud captured from a scanner 1001 and projected onto a range image 1002. For ease of illustration, the range image projections shown in FIGS. 10 and 11 are planar perspective projections rather than equirectangular spherical projections; the concepts illustrated apply equally to all types of projections. The pixels of range image 1002 may be divided into tiles 1011, 1012, 103, and 1014. Four tiles are shown here for simplicity; one or more embodiments may use any number of tiles of any dimensions. For each tile, a bounding volume may be calculated around the points projected onto pixels within that tile. This bounding volume may be for example a frustum projected outward from the tile, with front and back faces determined by the minimum and maximum distances from the viewpoint, respectively, of the points projected into the tile's pixels. FIG. 10 illustrates two frusta 1021 and 1022 for tiles 1011 and 1014, respectively.

Once bounding volumes are calculated for points projected into tiles, these bounding volumes may be used to optimize closeness testing, as illustrated in FIG. 11. FIG. 11 illustrates two point clouds 1121 and 1122 captured by scanners 1001 and 1101, and projected onto range images 1002 and 1102, respectively. Each range image is divided into four tiles for illustration, and the frusta bounding volumes associated with each tile are shown. A first level closeness test for points may be defined by determining whether the bounding volumes containing the points intersect. In the example shown in FIG. 11, only frusta 1022 and 1103 intersect. Therefore, close points between the two point clouds 1121 and 1122, if any, may be found only in points projected to tile 1014 in range image 1002 and projected to tile 1112 in range image 1102. Points from all other tiles may not need to be evaluated for closeness testing. For example, if the procedure described in FIGS. 8 and 9 is used to find groups of close points between point clouds 11201 and 1122 by projecting points of cloud 1122 onto range image 1002 with projection 1110, only points in volume 1103 need to be projected to tile 1014 for evaluation of closeness.

In one or more embodiments of the invention, tile bounding volumes such as those shown in FIG. 11 may be calculated for all point clouds that are to be merged, and each bounding volume may be checked for intersection with bounding volumes from other point clouds. Intersection testing may be performed quickly via well-known algorithms such as those based on the separating axis theorem. Each tile bounding volume may be linked for example to the tile bounding volumes with which it intersects. When evaluating a range image region for point cloud overlaps with other point clouds, the tiles in that region may be used to identify the linked bounding volumes from other point clouds, and only points in those linked bounding volumes need be considered.

Figure 16:
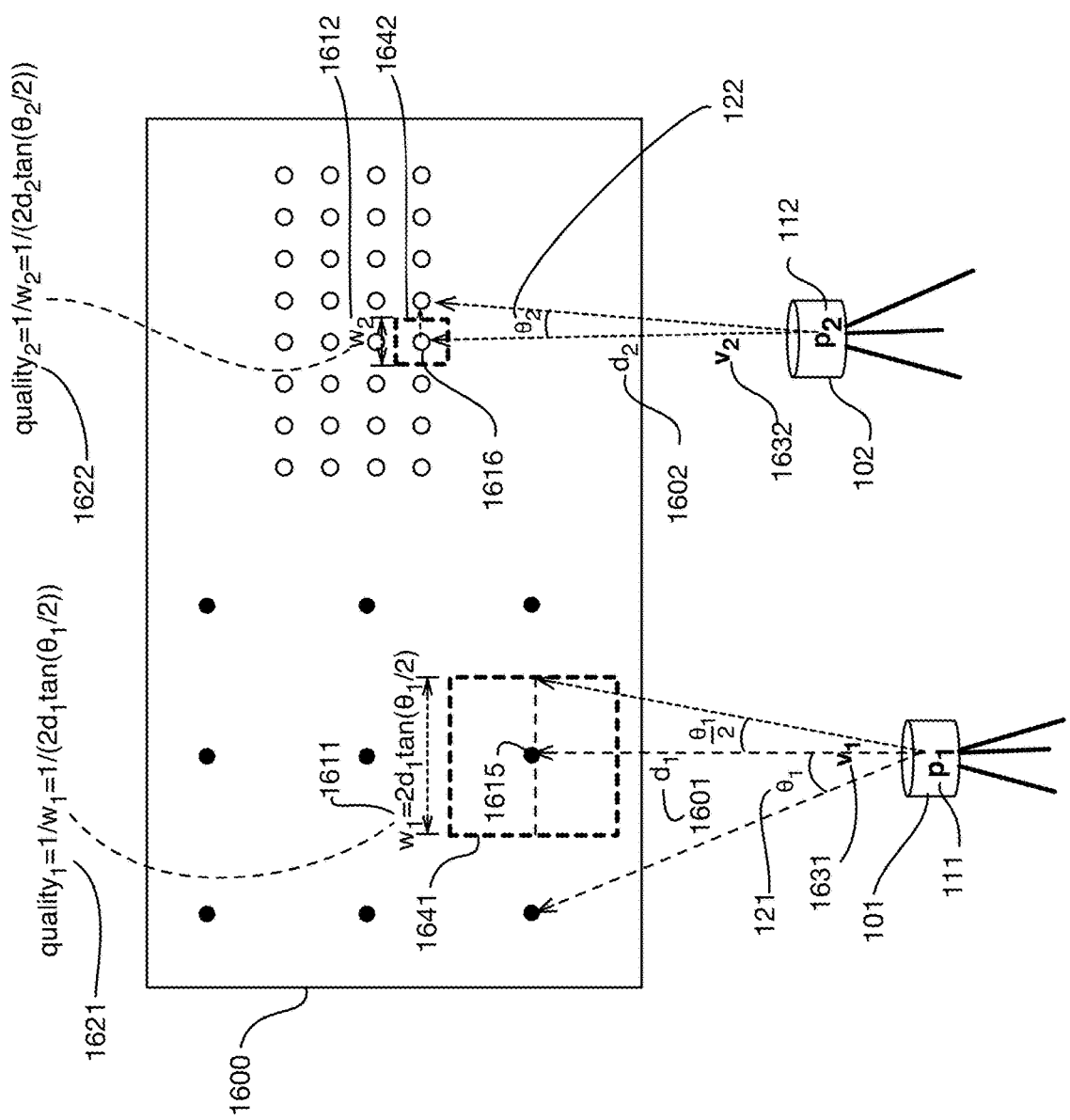
FIG. 16 shows an illustrative technique for automatic selection of preferred points that may be used in one or more embodiments; this technique compares the quality of two points clouds at a region of overlap by comparing the resolution of each point cloud in that region.
Figure 17:
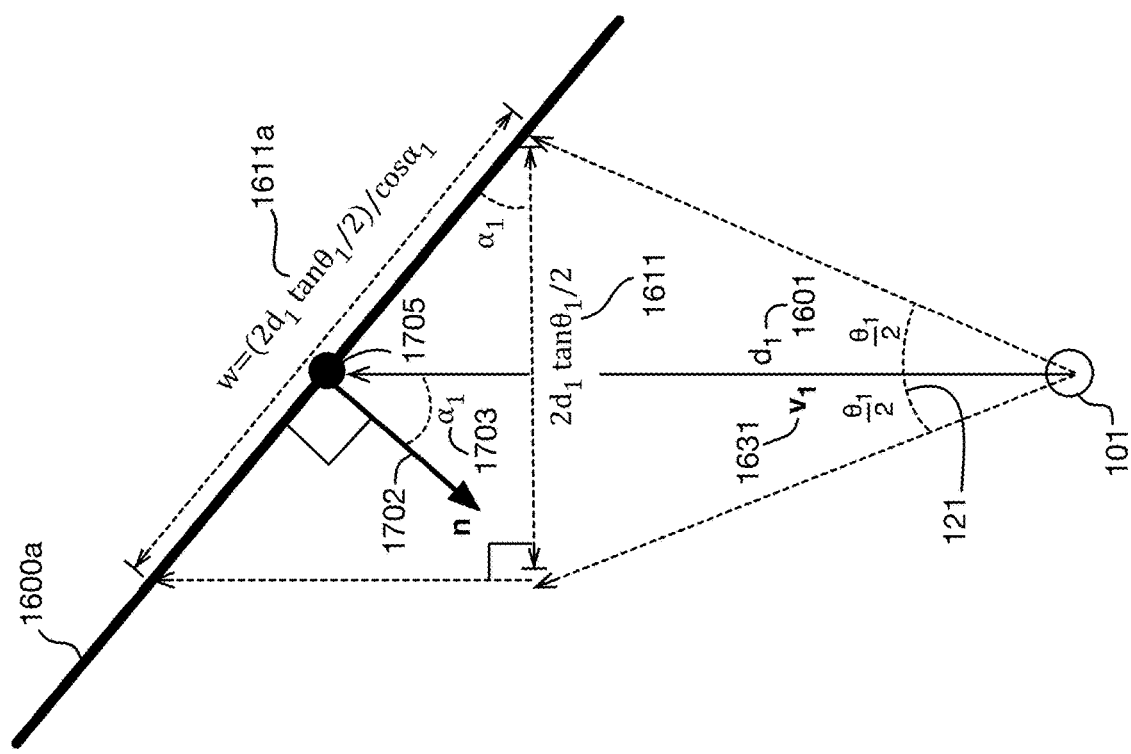
FIG. 17 extends the example of FIG. 16 to show calculation of a point cloud surface resolution when the surface is not perpendicular to the view vector from the point cloud scanner.

Turning now to identification of preferred points, one or more embodiments may use either methods that incorporate user input to select preferred points, or methods that are fully automatic. Combinations of these approaches may also be used, for example to automatically select proposed preferred points, and to confirm or reject these selections with manual input. FIGS. 12 through 15 illustrate a method that obtains user input to select preferred points, and FIGS. 16 and 17 illustrate an automated method. These methods are illustrative; one or more embodiments may use any type of method to identify preferred points from groups of close points.

In one or more embodiments, the system may present a user interface to a user and accept a selection of preferred points from this user interface. The embodiment illustrated in FIGS. 12 through 15 presents a user interface that is organized around 2D range image projections. The user may view point clouds from the perspective of any selected range image as a 2D projection of the point clouds. From these 2D views the user may indicate which point cloud should be used for preferred points in regions drawn or otherwise indicated by the user. Organizing user input around 2D projections of point clouds simplifies the user experience, since the user can select preferred points simply by drawing regions in a 2D image, as shown below.

Figure 12:
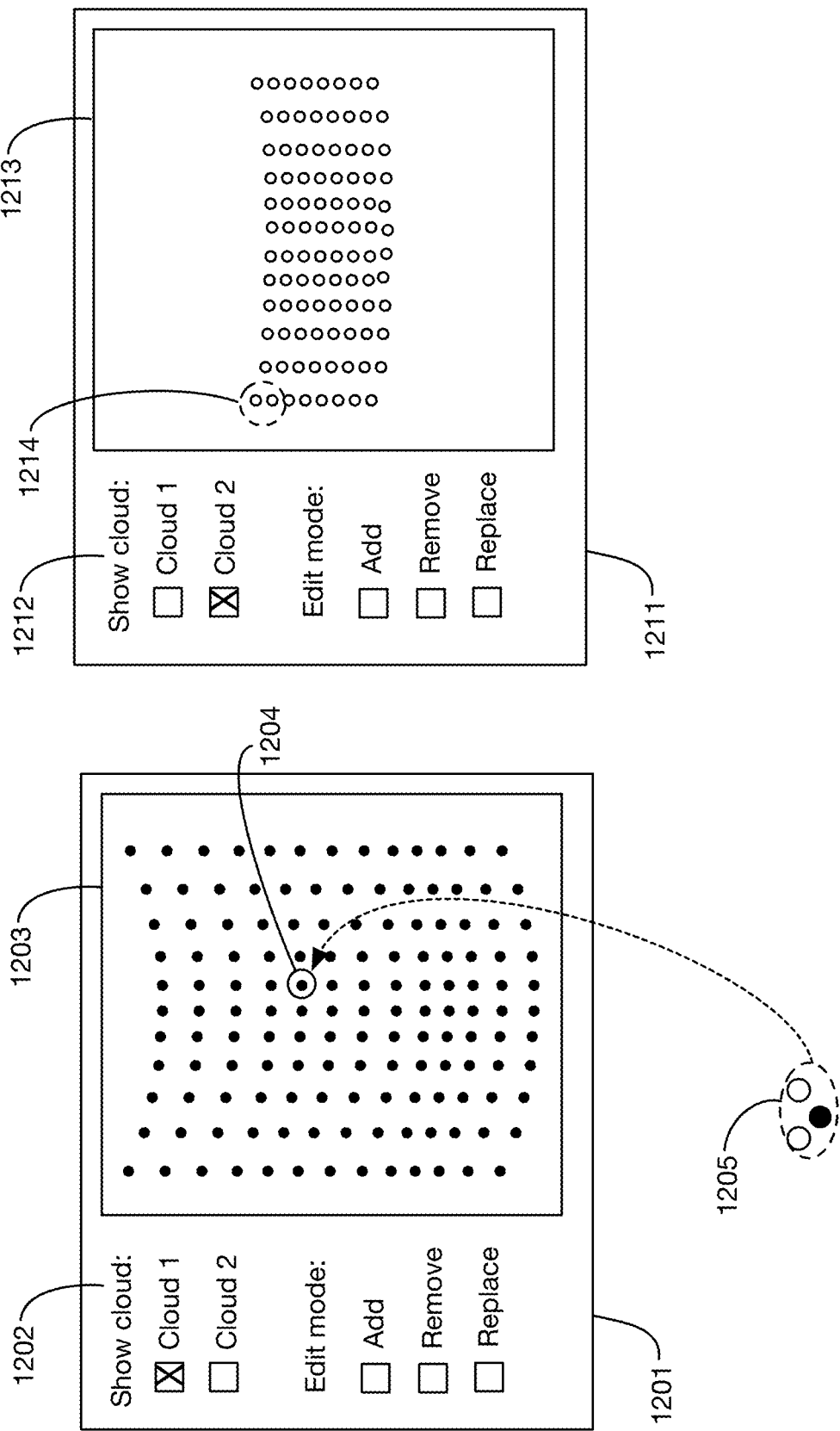
FIG. 12 shows an illustrative user interface that may be used for user selection of preferred points in overlapping regions of point clouds.

FIG. 12 shows an illustrative user interface with an initial screen 1201. The user selects which cloud range image to view in selection area 1202; this selection is initially set to cloud 1. The range image projection of the selected cloud is shown in window 1203. In screen 1211 the user switches to view cloud 2 in selection 1212, showing projection 1213. In these initial screens the user has not yet indicated any preferred points. When the system shows a range image projection associated with a cloud, it may track or calculate the points from other clouds that are close to the points shown in the projection. These points may be determined as described above, and may be optimized using pre-calculated bounding volume intersections as described with respect to FIG. 11. For example, point 1204 in window 1203 is associated with group 1205 that contains the points of cloud 2 close to this point. Similarly, in screen 1211, either of the points 1214 in window 1213 may be associated with this same group 1205. These associations may be calculated or tracked by the system as views are shown from the perspective of different point clouds. As the user makes selections in the screens, preferred points may be assigned for point groups such as group 1205. These assignments and reassignments of preferred points are illustrated in FIGS. 13 through 15.

Figure 13:
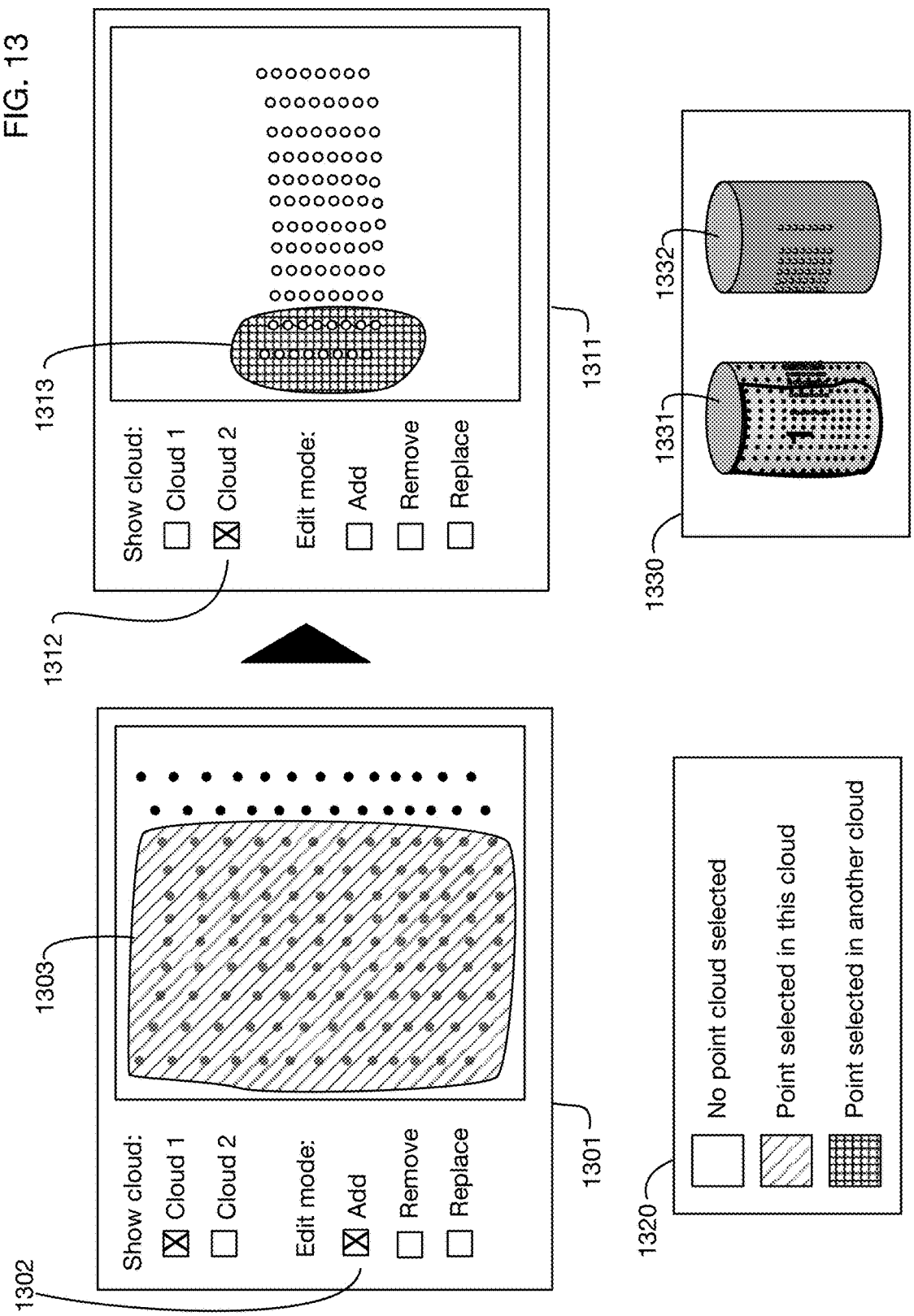
FIG. 13 continues the example of FIG. 12 to show user selection of points in one cloud, and viewing these selected points from the perspective of another cloud.

FIG. 13 continues this example to show a user selection of preferred points. In screen 1301, the user selects an Add action 1302 to add preferred points from the visible cloud. The user then draws, paints, or otherwise selects region 1303 to indicate that the points from cloud 1 in this region should be identified as preferred points in any groups of close points they belong to. One or more embodiments may indicate the status of points using various indicators such as size, tags, shapes, shading, pattern, or color; in the example shown in FIG. 13, legend 1320 shows that point status is indicated in these screens by pattern. This legend 1320 may be shown in the user interface or available on another screen in one or more embodiments. In one or more embodiments a user may also be able to see a 3D view of the point clouds, with indicators as to which points are selected as preferred points in each point cloud. For example, view 1330 may be available that shows all of the points and shows which points are selected as preferred points. (The cylinder 3D scene is shown in window 1330 for ease of exposition.) If the user switches in screen 1311 to view cloud 2 with selection 1312, the display shows region 1313 as having been selected as preferred points in another point cloud, because these points overlap with the selected points assigned to cloud 1 in region 1303. The user may incrementally select points as preferred points in different point clouds and see the effect of these selections from the perspective of different point clouds, and in 3D.

Figure 14:
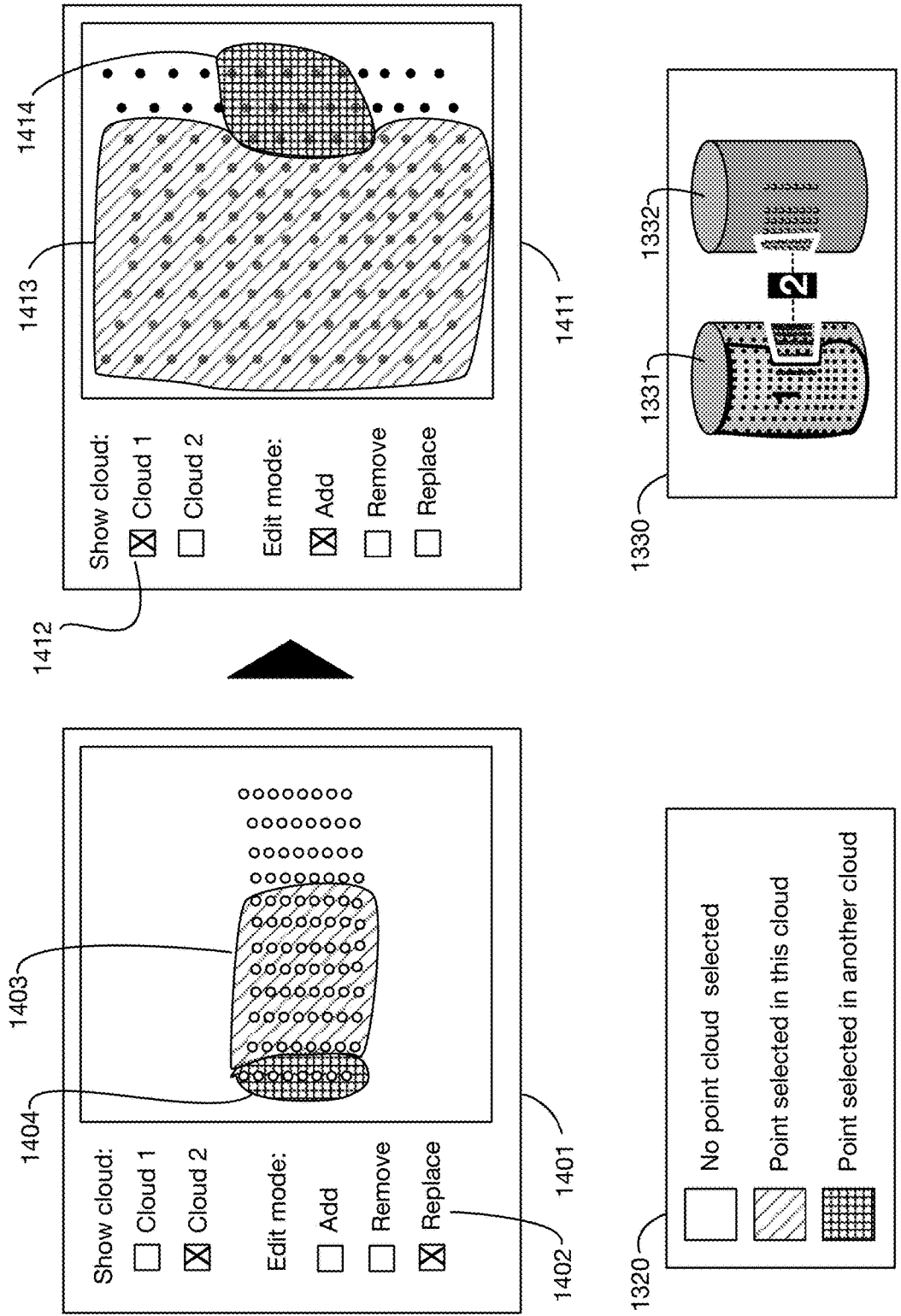
FIG. 14 continues the example of FIG. 13 to show the user replacing points selected in another cloud with points from the viewed cloud.

FIG. 14 continues this example with screen 1401, where again the user views the range image from the perspective of cloud 2. The user selects a Replace action 1402 and draws, paints, or otherwise selects region 1403 to replace points selected in a different point cloud with points from this point cloud. This replace action also adds new points that are previously unselected. This action reduces the region 1313 of points assigned to point cloud 1 to the smaller region 1404. When the user performs selection 1412 to view cloud 1 in screen 1411, the previously selected area 1303 selected for cloud 1 is reduced to area 1413, and points 1414 are shown as selected for a different cloud. Continuing this example, in FIG. 15, the user selects a Remove action 1502 in screen 1501, and then selects region 1503 to remove the assignment of these points to any point cloud. When the user switches to screen 1511 and makes selection 1512 to show the range image view of cloud 2, the points 1513 that had previously been selected in cloud 1 are now shown as unassigned.

The user interface screens, selection options, and actions shown in FIGS. 12 through 15 are illustrative examples. One or more embodiments may use any type of user interface to obtain input from a user to select preferred points for a merged point cloud. For a user interface that presents 2D projections like those shown in screens 1501 and 1511, any types of 2D drawing or image manipulation tools or controls may be used select and modify points, regions, areas, or shapes.

Instead of or in addition to obtaining user input to select preferred points, one or more embodiments may automatically select preferred points. Automatic selection may be performed for example using a point quality measure that is calculated for each of the points in a group of close points; the point with the highest quality measure in the group may be selected as the preferred point of the group. Any quality measure or measures may be used. FIGS. 16 and 17 illustrate calculation of a quality measure that reflects the level of detail of the 3D scene that is captured by each point cloud at each point in the scene. Points in regions where the associated point cloud captures greater detail may be given a higher quality measure, for example. Use of a quality measure based on level of detail may generate a merged point cloud that shows the scene in maximum detail without adding unnecessary or redundant points.

Level of detail captured by a point cloud at a point may be inversely related to the surface resolution of the point cloud at that point. This surface resolution at a point may be defined for example as the width of a pixel centered on the point when that pixel is projected onto the surface imaged by the point cloud at that point. This width may be viewed equivalently as the width the back face of a frustum extending from the pixel to the surface at that point. As illustrated in FIG. 16, this surface resolution may be a function of the angular resolution of the point cloud and of the distance between the viewpoint of the point cloud and the surface. For ease of illustration, the calculations in FIG. 16 show surface resolution along only one axis, the horizontal axis; one or more embodiments may calculate surface resolutions along multiple axes. In the example shown in FIG. 16, a planar surface 1600, which may represent a local portion of a 3D scene, is captured by two scanners 101 and 102, from viewpoints 111 and 112, respectively. The points of the two point clouds are shown as non-overlapping in FIG. 16 to highlight the calculation of the quality measures; generally these quality measures will be used in areas where the point clouds overlap in order to select the best point from a group of close points. Quality measure calculations are illustrated for two points: point 1615 from the point cloud captured by scanner 101, and point 1616 from the point cloud captured by scanner 102. If the scan points from scanner 101 are placed into pixels, with one point in the center of each pixel, then the pixel centered around point 1615 projected onto surface 1600 is rectangle 1641. The width 1611 of this rectangle may be used as a measure of the surface resolution of this point cloud at that point 1615. Similarly, the width 1612 of rectangle 1642 may be used as a measure of the surface resolution of the point cloud of scanner 102 at point 1616. Assuming for simplicity that the surface 1600 is perpendicular to the view vector 1631 from viewpoint 111 to point 1615, surface resolution 1611 equals twice the length 1601 of the view vector 1631 (which is the distance from the scanner to the surface) times the tangent of half of the scanner's angular resolution 121. Similarly, surface resolution 1612 equals twice the length 1602 of the view vector 1632 times the tangent of the half of the angular resolution 122 of scanner 102. These calculations result in quality measures 1621 and 1622 for points 1615 and 1616, respectively. In this example, surface resolution 1611 for the point cloud from scanner 101 is coarser (larger) than surface resolution 1612 for the point cloud from scanner 102; therefore, points from scanner 102 may be preferred in this region of the scan where they overlap.

The calculations for surface resolution and point quality measures described above in FIG. 16 assume that the view vector at a point is perpendicular to the scanned surface at that point. One or more embodiments of the invention may instead estimate the angle between the view vector and the normal vector to the scanned surface, rather than assuming that this angle is zero, and use this angle to refine the point quality measure. This approach is illustrated in FIG. 17. For simplicity, FIG. 17 shows a surface tilted around a vertical axis only, and it shows the geometry from a top view above the surface. The calculations illustrated in FIG. 17 generalize immediately to any surface orientation. Scan point 1705 lies on surface 1600a and a pixel centered on this point is projected to the surface. The projected pixel has width 1611a, which is the surface resolution of the point cloud on surface 1600a at the point 1705. Surface 1600a (shown from the top) has a normal vector 1702 which is at angle 1703 with respect to the view vector 1631 to the point 1705. Trigonometric calculations show that the projected pixel width 1611a is twice the distance 1601 times the tangent of half of the angular resolution 121, divided by the cosine of the angle 1703. The quality measure may be calculated for example as the inverse of this surface resolution 1611a. The nonzero angle 1703 between the view vector and the surface normal results in the surface resolution being divided by the cosine of the angle 1703; the quality measure is therefore multiplied by this factor.

The normal vector 1702 to a surface may be calculated from the point cloud data, or it may be available from other information about the scene. An illustrative technique that may be used in one or more embodiments is the least-squares method of normal estimation known in the art. This technique fits a plane through the points in a small patch of point cloud, such as a 3×3 array of pixels in a range image centered at the pixel for which the normal vector is calculated. The normal vector to the fitted plane may be used as the normal to the surface at that point.

Figure 18A:
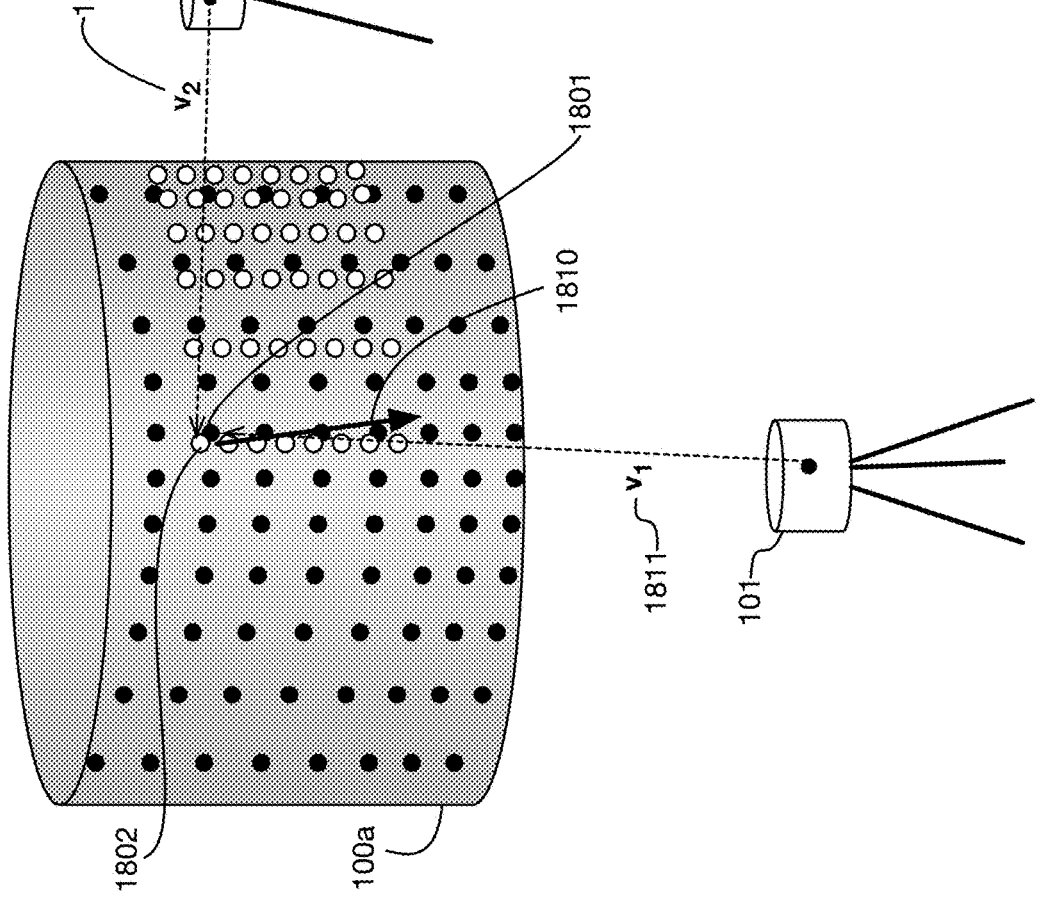
FIGS. 18A and 18B show an application of point quality comparison for automatic selection of preferred points to the scans from FIG. 1.
Figure 18B:
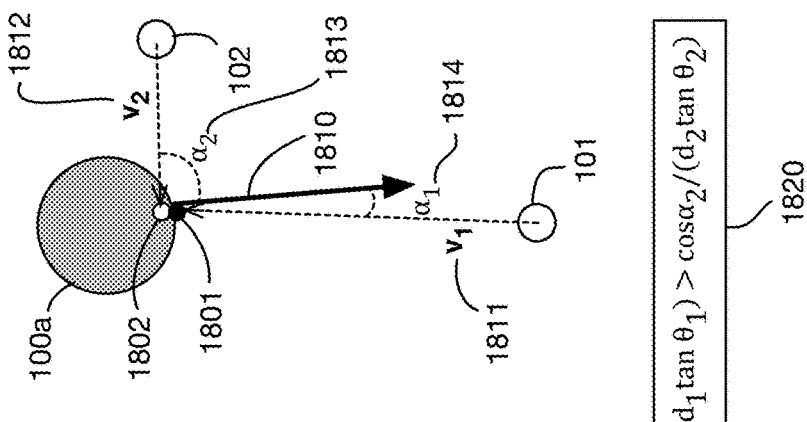

FIGS. 18A and 18B illustrate how the adjusted quality measure described in FIG. 17 may be used to select preferred points. A portion 100a of the cylinder scene of FIG. 1 is shown. FIG. 18A shows a perspective view, and FIG. 18B shows a top view. Points 1801 captured by scanner 101 and 1802 captured by scanner 102 are in a group of close points. Automatic selection of the preferred point between points 1801 and 1802 may take into account all three of the factors described above: distance between the scanner and the point, the scanner's angular resolution, and the angle between the scan view vector and the surface normal. In this example, scanner 102 may be positioned closer to scene 100a, and the angular resolution of scanner 102 may be smaller; however, at points 1801 and 1802 respectively, the view vector 1811 from scanner 101 is almost parallel to the surface normal vector 1810, while the view vector 1812 from scanner 102 is almost perpendicular to the normal vector 1810. Thus, the cosine of angle 1814 is close to 1, but the cosine of angle 1813 is close to zero. The quality measure comparison 1820 between the two points 1801 and 1802 therefore selects point 1801.

While the invention herein disclosed has been described by means of specific embodiments and applications thereof, numerous modifications and variations could be made thereto by those skilled in the art without departing from the scope of the invention set forth in the claims.

What is claimed is:

1. A method of merging point clouds that identifies and retains preferred points, comprising:
  using a computer coupled to a memory to
    obtain a plurality of point clouds captured from a 3D scene, each point cloud of said plurality of point clouds comprising
      a plurality of points;
      a viewpoint; and
      an angular resolution;
    obtain or generate a closeness test that determines whether two distinct points from said plurality of point clouds are sufficiently close to one another that at most one of the two distinct points should be retained;
    identify one or more groups of close points, wherein each group of said one or more groups of close points comprises two or more points from said plurality of point clouds; and each point of said two or more points of said each group satisfies said closeness test with respect to a different point of said two or more points of said each group;
identify isolated points, wherein said isolated points comprises all points from said plurality of point clouds that are not in any group of said one or more groups of close points;
for each group of said one or more groups of close points,
identify a preferred point of said two or more points of said each group; and,
generate a merged point cloud comprising
said isolated points; and
said preferred point of each group of said one or more groups of close points;
wherein said merged point cloud does not contain points of said each group that are not said preferred point.

2. The method of claim 1, wherein
said each point cloud comprises
a range image that represents said plurality of points as a 2D array of pixels, wherein
each point of said plurality of points corresponds to a pixel of said 2D array of pixels; and
each pixel of said 2D array of pixels comprises a distance between a point associated with said pixel and said viewpoint of said each point cloud; and,
a projection from said 3D scene to said 2D array of pixels.

3. The method of claim 2, wherein said projection comprises
a mapping from a point in said 3D scene to a sphere centered at said viewpoint; and,
an equirectangular projection from said sphere to said 2D array of pixels.

4. The method of claim 2, wherein said identify one or more groups of close points comprises
select a base point cloud of said plurality of point clouds;
select a set of pixels from said 2D array of pixels of said base point cloud;
select a set of points from said plurality of point clouds other than said base point cloud;
apply said projection associated with said base point cloud to each point of said set of points to obtain
a projected pixel of said 2D array of pixels of said base point cloud; and
a projected distance between said each point and said viewpoint of said base point cloud; and,
when said projected distance is within a threshold value of said distance associated with said projected pixel in said base point cloud,
add said each point and the point in said base point cloud associated with said projected pixel to a group of close points associated with said projected pixel.

5. The method of claim 2, further comprising using said computer to
partition said 2D array of pixels of said each point cloud into a plurality of tiles;
for each tile of said plurality of tiles,
generate a bounding volume that contains points of said each point cloud that are projected to pixels in said each tile;
identify tiles associated with said plurality of point clouds other than said each point cloud that have associated bounding volumes that intersect said bounding volume.

6. The method of claim 5, wherein said identify one or more groups of close points comprises
select a base point cloud of said plurality of point clouds;
select a set of tiles from said base point cloud;
select a set of points from said plurality of point clouds other than said base point cloud, said set of points comprising points in tiles of said plurality of point clouds other than said base point cloud that intersect with one or more tiles of said set of tiles from said base point cloud;
apply said projection associated with said base point cloud to each point of said set of points to obtain
a projected pixel of said 2D array of pixels of said base point cloud; and
a projected distance between said each point and said viewpoint of said base point cloud;
when said projected distance is within a threshold value of said distance associated with said projected pixel in said base point cloud,
add said each point and the point in said base point cloud associated with said projected pixel to a group of close points associated with said projected pixel.

7. The method of claim 2, wherein said identify said preferred point of said two or more points of said each group comprises
present a user interface to a user that displays a set of points from a first point cloud of said plurality of point clouds;
for each point of said set of points that is in a group of said groups of said close points, display an indicator in said user interface that indicates whether said each point is the preferred point of said group;
accept a selection input from said user to select one or more selected points from said set of points from said first point cloud;
accept an edit action input from said user, wherein said edit action input comprises an add action or a remove action;
when said edit action is said add action, set said one or more selected points as preferred points of groups of close points that contain said one or more selected points; and,
when said edit action is said remove action, set said one or more selected points as not preferred points of groups of close points that contain said one or more selected points.

8. The method of claim 7, wherein said indicator further indicates whether the preferred point of said group is a point in a second point cloud different from said first point cloud.

9. The method of claim 8, wherein
said indicator is a color, pattern, or shade applied to a pixel of said 2D array of pixels of said first point cloud that contains said each point; and,
said color, pattern, or shade comprises
a first value that indicates that said each point is the preferred point of said group;
a second value that indicates that the preferred point of said group is a point in a second point cloud different from said first point cloud; and,
a third value that indicates that said group does not have a preferred point designated.

10. The method of claim 6, wherein said identify said preferred point of said two or more points of said each group comprises
present a user interface to a user that displays a set of points from a first point cloud of said plurality of point clouds;

for each point of said set of points that is in a group of said groups of said close points, display an indicator in said user interface that indicates whether said each point is the preferred point of said group;

accept a selection input from said user to select one or more selected points from said set of points from said first point cloud;

accept an edit action input from said user, wherein said edit action input comprises an add action or a remove action;

when said edit action is said add action, set said one or more selected points as preferred points of groups of close points that contain said one or more selected points; and, when said edit action is said remove action, set said one or more selected points as not preferred points of groups of close points that contain said one or more selected points.

11. The method of claim 10, wherein said indicator further indicates whether the preferred point of said group is a point in a second point cloud different from said first point cloud.

12. The method of claim 11, wherein
said indicator is a color, pattern, or shade applied to a pixel of said 2D array of pixels of said first point cloud that contains said each point; and,
said color, pattern, or shade comprises
a first value that indicates that said each point is the preferred point of said group;
a second value that indicates that the preferred point of said group is a point in a second point cloud different from said first point cloud; and,
a third value that indicates that said group does not have a preferred point designated.

13. The method of claim 1, wherein said identify said preferred point comprises
calculate a quality measure for each point of said two or more points of said each group; and,
identify said preferred point as a point of said two or more points with a highest quality measure.

14. The method of claim 13, wherein said quality measure for said each point is inversely related to a resolution at said each point of a point cloud containing said each point.

15. The method of claim 14, wherein said resolution comprises
two times a length of a view vector from
the viewpoint of said point cloud containing said each point, to
said each point,
multiplied by
a tangent of one half of said angular resolution of said point cloud.

16. The method of claim 15, wherein said resolution is further divided by
a cosine of an angle between
said view vector, and
a normal vector to a surface on which said each point lies in said 3D scene.

17. The method of claim 6, wherein said identify said preferred point comprises
calculate a quality measure for each point of said two or more points of said each group; and,
identify said preferred point as a point of said two or more points with a highest quality measure.

18. The method of claim 17, wherein said quality measure for said each point is inversely related to a resolution at said each point of a point cloud containing said each point.

19. The method of claim 18, wherein said resolution comprises
two times a length of a view vector from
the viewpoint of said point cloud containing said each point, to
said each point,
multiplied by
a tangent of one half of said angular resolution of said point cloud.

20. The method of claim 19, wherein said resolution is further divided by
a cosine of an angle between
said view vector, and
a normal vector to a surface on which said each point lies in said 3D scene.

* * * * *